UNITED STATES PATENT OFFICE.

PAUL WILSON TURNEY, OF RICHMOND, VIRGINIA.

DESICCATED CASEIN PRECIPITATE.

1,364,417. Specification of Letters Patent. Patented Jan. 4, 1921.

No Drawing. Application filed April 19, 1918. Serial No. 229,620.

*To all whom it may concern:*

Be it known that I, PAUL W. TURNEY, a citizen of the United States, and resident of Richmond, in the county of Henrico and State of Virginia, have invented certain new and useful Improvements in Desiccated Casein Precipitate, of which the following is a specification.

The object of my invention is to obtain a desiccated casein precipitate, the latter having first been produced in the following manner:

I take fresh milk (skimmed or unskimmed) and heat the same to from 80° to 100° F. in order to ripen it for curdling by the aid of an enzym. I then add the latter in the form of rennet or pepsin, maintaining said temperature so as to facilitate the coagulation of the casein. The curdling process, however, is permitted to develop only to that degree when the flocculent particles attain a tendency to stick together, as may be readily ascertained by taking a sample of the precipitate between two fingers and then moving them apart. When this stage has been reached, the temperature of the milk must be rapidly lowered to 45° F. or below, so as to render the enzym inactive. During the cooling of the mass it is necessary that it be gently agitated for the purpose of breaking up the adhesion of the coagulated casein particles and releasing the whey. Then the mass may be allowed to stand for a sufficient time to permit the precipitate to settle, which usually takes from two to twelve hours according to the degree of separation of the whey to be effected. The latter is then poured off and the residue will be found to be a mass of creamy consistency. Said precipitate is then evaporated in a suitable vacuum, say from 15 to 25 inches pressure in a temperature of 50° F. or below. The process of evaporation is, however, preferably pursued as follows: The material is sprayed into the vacuum chamber with a current of air, the latter being withdrawn from the chamber. In this way the precipitate will be very speedily and thoroughly dried and will collect in powder form at the bottom of the vacuum chamber; the moisture laden air of the vacuum chamber being drawn off by the air pump. Then the vacuum is broken, and the chamber opened and the powdered casein precipitate removed to suitable containers.

By reason of the dry state of this powdered casein precipitate there is no danger of the enzym intermixed therewith becoming again active, since it is necessary in order to throw the enzym into an active state that it be supplied with water as its vehicle.

If the enzym used be pepsin, then, as evident, the casein precipitate obtained will be partially predigested.

Furthermore, if the constituents of the whey are also to be retained in the desiccated product, then the pouring off of the whey is omitted—the settling of the casein precipitate is also unnessary—and the whole mass may be evaporated in the manner described.

Since the evaporation is carried on at said low temperature, the casein precipitate is inhibited from change.

I claim:—

1. The process of producing a desiccated milk food product consisting in curdling milk by an enzym to the degree producing a flocculent precipitate, then arresting further activity of the enzym by low temperature, then spraying the product into a chamber also maintained at low temperature and under partial vacuum, and dehydrating the product by causing constant air-currents to pass therethrough in said chamber.

2. The process of producing a desiccated milk food product consisting in curdling milk by an enzym to the degree producing a flocculent precipitate, then arresting further activity of the enzym by low temperature, then spraying the precipitate into a chamber also maintained at low temperature and under partial vacuum and dehydrating the precipitate by causing constant air-currents to pass therethrough in said chamber.

In testimony whereof I affix my signature.

PAUL WILSON TURNEY.